(12) United States Patent
Kim et al.

(10) Patent No.: US 7,976,969 B2
(45) Date of Patent: Jul. 12, 2011

(54) NO-WELDING TYPE BATTERY PACK USING FORCED-INSERTING TYPE RIVET

(75) Inventors: Jung-hwan Kim, Seoul (KR); Sukjin Song, Yongin-si (KR); Ki eob Moon, Seoul (KR); Soonkwang Jung, Seoul (KR); Jo Moon, Seoul (KR)

(73) Assignee: LG Chem, Ltd. (KR)

( * ) Notice: Subject to any disclaimer, the term of this patent is extended or adjusted under 35 U.S.C. 154(b) by 1118 days.

(21) Appl. No.: 11/613,709

(22) Filed: Dec. 20, 2006

(65) Prior Publication Data

US 2007/0160878 A1 Jul. 12, 2007

(30) Foreign Application Priority Data

Dec. 22, 2005 (KR) .......................... 10-2005-0127545
Jan. 17, 2006 (KR) .......................... 10-2006-0004728
Feb. 13, 2006 (KR) .......................... 10-2006-0013569

(51) Int. Cl.
*H01M 2/34* (2006.01)
*H01M 2/04* (2006.01)

(52) U.S. Cl. ............................ 429/7; 429/61; 429/175

(58) Field of Classification Search ........................ 429/7
See application file for complete search history.

(56) References Cited

U.S. PATENT DOCUMENTS

2002/0041993 A1* 4/2002 Kim et al. ...................... 429/56
2005/0214597 A1* 9/2005 Kim et al. ...................... 429/7

FOREIGN PATENT DOCUMENTS

| JP | 2003208886 A * | 7/2003 |
| KR | 1020030033594 | 5/2003 |
| KR | 1020050077480 | 8/2005 |
| KR | 1020050080514 | 8/2005 |

* cited by examiner

*Primary Examiner* — Patrick Ryan
*Assistant Examiner* — Brent Thomas
(74) *Attorney, Agent, or Firm* — Cantor Colburn LLP

(57) ABSTRACT

Disclosed herein is a no-welding type battery pack using one or more forced-inserting type rivets. A cap assembly includes a base plate mounted to an open upper end of a battery case, a protection circuit module (PCM) mounted on the base plate, and a top cap coupled to the upper end of the battery case while the top cap covers the PCM. The top cap is made of an insulative material. The electrical connection and the mechanical coupling between the PCM and the base plate are accomplished by one or more forced-inserting type rivets. The cap assembly is included the battery pack. The no-welding type battery pack using the one or more forced-inserting type rivets is manufactured without welding or soldering requiring an excessive amount of time and skilled technique during the electrical connection between the battery cell and the PCM. As a result, the assembly process of the battery pack is simplified, and therefore, the manufacturing time of the battery pack is reduced. Consequently, the manufacturing costs of the battery pack are decreased, the automation of the assembly process is accomplished, and the structural stability of the battery pack is improved.

17 Claims, 6 Drawing Sheets

NO-WELDING TYPE BATTERY PACK USING FORCED-INSERTING TYPE RIVET

FIELD OF THE INVENTION

The present invention relates to a no-welding type battery pack using one or more forced-inserting type rivets, and, more particularly, to a cap assembly including a base plate mounted to an open upper end of a battery case, a protection circuit module (PCM) mounted on the base plate, and a top cap coupled to the upper end of the battery case while the top cap covers the PCM, the top cap being made of an insulative material, wherein the electrical connection and the mechanical coupling between the PCM and the base plate are accomplished by one or more forced-inserting type rivets, and a battery pack including the same.

BACKGROUND OF THE INVENTION

As mobile devices have been increasingly developed, and the demand of such mobile devices has increased, the demand of secondary batteries has also sharply increased. One of the secondary batteries is a lithium secondary battery having high energy density, high operation voltage, and excellent storage and service life characteristics, which is now widely used as an energy source for various electronic products as well as various kinds of mobile devices.

However, various combustible materials are contained in the lithium secondary battery. As a result, there is a possibility of danger in that the lithium secondary battery can be heated or explode due to overcharge, overcurrent, or any other external physical impacts. In other words, the lithium secondary battery has low safety. Consequently, a protection circuit module (PCM) for effectively controlling the abnormality of the battery, such as overcharge, is mounted in the lithium secondary battery while the PCM is connected to a battery cell of the lithium secondary battery.

The PCM includes a field effect transistor (FET), which serves as a switching element for controlling electric current, a voltage detector, and passive elements such as a resistor and a capacitor. The PCM interrupts overcharge, overdischarge, overcurrent, short circuits, and reverse voltage of the battery to prevent the explosion or the overheating of the battery, the leakage of liquid from the battery, and the degradation of the charge and discharge characteristics of the battery, and to suppress the lowering of the electrical efficiency of the battery and the abnormal physicochemical behavior of the battery, thereby eliminating dangerous factors from the battery and increasing the service life of the battery.

Generally, the PCM is connected to the battery cell via a conductive material, such as a nickel plate, by welding or soldering. Specifically, the nickel plate is connected to electrode taps of the PCM by welding or soldering, and then the nickel plate is connected to electrode terminals of the battery cell by welding or soldering. In this way, the PCM is connected to the battery cell so as to manufacture a battery pack.

In this case, several welding or soldering processes are needed to construct the battery pack, and the welding or soldering processes must be carried out with high precision because the size of the secondary battery is small. As a result, a possibility of defect is high. Furthermore, the addition of the welding or soldering processes increases the manufacturing costs of the battery pack.

Consequently, a method of assembling the PCM to the battery cell without spot welding or soldering is highly required.

SUMMARY OF THE INVENTION

Therefore, the present invention has been made to solve the above problems, and other technical problems that have yet to be resolved.

Specifically, it is an object of the present invention to provide a cap assembly that is capable of electrically connecting a protection circuit module (PCM) to a battery cell without welding or soldering requiring an excessive amount of time and skilled technique, thereby simplifying the assembly process of a battery pack and reducing the manufacturing time of the battery pack, and therefore, decreasing the manufacturing costs of the battery pack, and accomplishing the automation of the assembly process.

It is another object of the present invention to provide a battery pack including the cap assembly, whereby the structural stability of the battery pack is improved.

In accordance with one aspect of the present invention, the above and other objects can be accomplished by the provision of a cap assembly including a base plate mounted to an open upper end of a battery case, a PCM mounted on the base plate, and a top cap coupled to the upper end of the battery case while the top cap covers the PCM, the top cap being made of an insulative material, wherein the electrical connection and the mechanical coupling between the PCM and the base plate are accomplished by one or more forced-inserting type rivets.

With the cap assembly according to the present invention, therefore, it is possible to accomplish the electrical connection and mechanical coupling between the PCM and the base plate using the rivets. Consequently, the manufacturing costs of a battery pack are reduced, the assembly process of the battery pack is simplified, and the problems caused by welding or soldering are eliminated.

In the present invention, the forced-inserting type connection means a connection accomplished by applying a strong external force to a first plate having a cylindrical protruding terminal formed thereon such that the protruding terminal of the first plate can be forcibly inserted into a circular through-hole formed in a second plate such that the inner diameter of the through-hole of the second plate is substantially equal to or slightly less than the outer diameter of the protruding terminal of the first plate.

In a preferred embodiment, the PCM and the base plate are provided with two through-holes connected to a cathode and anode of a battery, and the rivets are inserted through the corresponding through-holes while the PCM is positioned on the base plate, whereby the electrical connection and mechanical coupling between the PCM and the base plate are accomplished.

One of the rivets (rivet (A)) includes a cylindrical body and a plate-shaped body, having a predetermined thickness, formed at the middle of the cylindrical body, such that the rivet (A) serves to space the PCM and the base plate by a predetermined distance from each other, and the rivet (A) constitutes a protruding terminal located on the base plate, and the other rivet (rivet (B)) includes a plate-shaped upper end and a cylindrical body.

Preferably, the cap assembly further includes a gasket mounted at the through-hole (a) of the base plate, through which the rivet (A) is inserted, such that the gasket covers the upper end surface, the lower end surface, and the inner circumferential surface of the through-hole (a), the gasket being made of an insulative material. Also preferably, the cap assembly further includes a conductive plate mounted to the lower end of the gasket, the conductive plate having an opening, connected to an electrode terminal of a battery cell, through which the lower end of the rivet (A) is inserted. Due to the above-described structure of the cap assembly, the rivet (A) is electrically insulated by the gasket except for specific regions of the conductive plate and the PCM, when the rivet (A) is interposed between the base plate and the PCM. Specifically, the rivet (A) constitutes an upper protruding terminal on the base plate serving as a cathode or anode terminal while the rivet (A) is insulated by the gasket. The upper protruding terminal serves as an electrode opposite to the base plate, i.e., an anode or cathode terminal.

In the above-described structure, the rivet (A) may have a length sufficient to be sequentially inserted through the PCM, the base plate, the gasket, and the conductive plate and be pressed to the upper end surface of the PCM and the lower end surface of the conductive plate.

Preferably, the base plate is provided around the through-hole (a) thereof, through which the rivet (A) is inserted, with a depression, in which the plate-shaped body of the rivet (A) is located, and the PCM is provided around the through-hole (b) thereof, through which the rivet (B) is inserted, with a depression, in which the plate-shaped upper end of the rivet (B) is located. Preferably, the depression (a) has a size corresponding to that of the gasket such that the plate-shaped body of the rivet (A) can be located in the depression (a) through the gasket.

The gasket may include two members coupled to the upper and lower end surfaces of the base plate, or the gasket may be formed in an integrated structure by insert injection molding.

According to circumstances, three rivets may be inserted through the through-holes, while the PCM is positioned on the base plate, so as to accomplish the electrical connection and mechanical coupling between the PCM and the base plate. The first rivet may be inserted through the through-hole (Pa) of the PCM and the through-hole (Ba) of the base plate, and the third rivet may be coupled to the upper end of the second rivet through the through-hole (Pb) of the PCM. The first rivet includes a plate-shaped upper end and a cylindrical body, the second rivet includes a plate-shaped upper end and a cylindrical body, and the third rivet includes a plate-shaped upper end and a cylindrical body. A coupling hole corresponding to the cylindrical body of the third rivet is formed in the upper end of the second rivet such that the third river can be coupled to the upper end of the second rivet in a forced-inserting fashion.

In another preferred embodiment, the PCM has two through-holes (a, b) connected to a cathode and an anode of a battery, respectively, and the base plate is provided with a coupling member and a through-hole (c) corresponding to the through-holes of the PCM, respectively. While the PCM is positioned on the base plate, the coupling member is inserted through the through-hole (a), and the rivet is inserted through the through-hole (b) and the through-hole (c), whereby the electrical connection and mechanical coupling between the PCM and the base plate are accomplished.

The rivet includes a cylindrical body and a plate-shaped body, having a predetermined thickness, formed at the middle of the cylindrical body, such that the rivet serves to space the PCM and the base plate by a predetermined distance from each other, and the rivet constitutes a protruding terminal located on the base plate. The coupling member is a cylindrical member protruding from the base plate by a length corresponding to the space distance between the PCM and the base plate while the rivet is inserted through the through-hole (b) of the PCM and the through-hole (c) of the base plate.

In accordance with another aspect of the present invention, there is provided a battery pack including the cap assembly with the above-stated construction. The battery pack is manufactured by coupling the cap assembly to an open upper end of a battery case having an electrode assembly constructed in a cathode/separator/anode structure mounted therein. Preferably, the battery pack includes a prismatic battery having an electrode assembly mounted in a prismatic metal battery case.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Now, preferred embodiments of the present invention will be described in detail with reference to the accompanying drawings. It should be noted, however, that the scope of the present invention is not limited by the illustrated embodiments.

Figure 1:
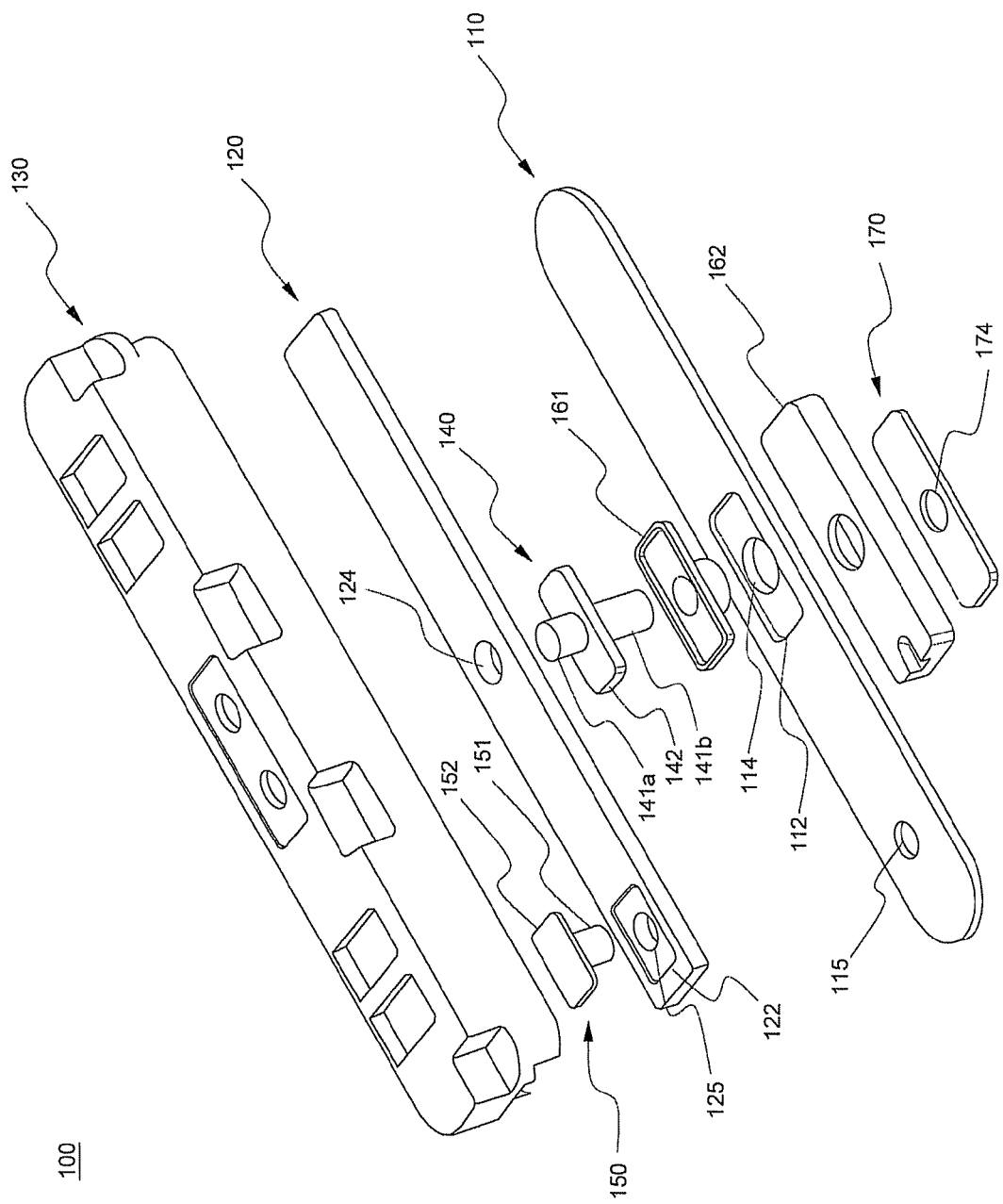
FIG. 1 is an exploded perspective view illustrating a cap assembly according to a first preferred embodiment of the present invention.

FIG. 1 is an exploded perspective view illustrating a cap assembly according to a first preferred embodiment of the present invention.

Referring to FIG. 1, the cap assembly 100 includes a base plate 110 mounted to an open upper end of a battery case (not shown), a protection circuit module (PCM) 120 mounted on the base plate 110, and a top cap 130 coupled to the upper end of the battery case while the top cap 130 covers the PCM 120. The top cap 130 is made of an insulative material.

The base plate 110 and the PCM 120 are provided in the middles thereof with through-holes 114 and 124, respectively, through which a rivet 140 is inserted. The rivet 140 is connected to an anode of a battery. The base plate 110 and the PCM 120 are provided in a one-side part thereof with through-holes 115 and 125, respectively, through which a rivet 150 is inserted. The rivet 150 is connected to a cathode of the battery. While the PCM 120 is located on the base plate 110, therefore, the rivet 140 is inserted through the corresponding through-holes 114 and 124, and the rivet 150 is inserted through the corresponding through-holes 115 and 125, thereby accomplishing the mechanical coupling and electrical connection between the base plate 110 and the PCM 120.

The rivet 140, which is connected to the anode of the battery, serves to space the base plate 110 and the PCM 120 from each other. Also, the rivet 140 constitutes a protruding terminal located on the base plate 110. The rivet 140 includes cylindrical bodies 141a and 141b and a plate-shaped body 142, having a predetermined thickness, interposed between the cylindrical bodies 141a and 141b. The upper cylindrical body 141a of the rivet 140 is inserted through the through-hole 124, and the lower cylindrical body 141b of the rivet 140 is inserted through the through-hole 114.

On the other hand, the rivet 150, which is connected to the cathode of the battery, includes a cylindrical body 151 and a plate-shaped upper end 152. The cylindrical body 151 of the rivet 150 is sequentially inserted through the through-holes 125 and 115.

Before the rivet 140 is inserted through the through-hole 114 of the base plate 110, an insulative gasket is mounted at the through-hole 114. The gasket includes an upper gasket 161 and a lower gasket 162. The upper and lower gaskets 161 and 162 are mounted at the though-hole 114 in such a manner that the upper and lower gaskets 161 and 162 cover the upper end surface, the lower end surface, and the inner circumferential surface of the through-hole 114.

To the lower end of the lower gasket 162 is mounted a conductive plate 170. The conductive plate 170 is a region where an anode terminal of a battery cell (not shown) is connected by welding. The conductive plate 170 is provided with an opening 174, through which the lower end of the rivet 140 is inserted.

Around the through-hole 114 of the base plate 110 is formed a depression 112, in which the plate-shaped body 142 of the rivet 140 is located when the rivet 140 is inserted through the through-hole 114 via the upper and lower gaskets 161 and 162. Around the through-hole 125 of the PCM 120, through which the rivet 150 is inserted, is also formed a depression 122, in which the plate-shaped upper end 152 of the rivet 150 is located.

Figure 2:
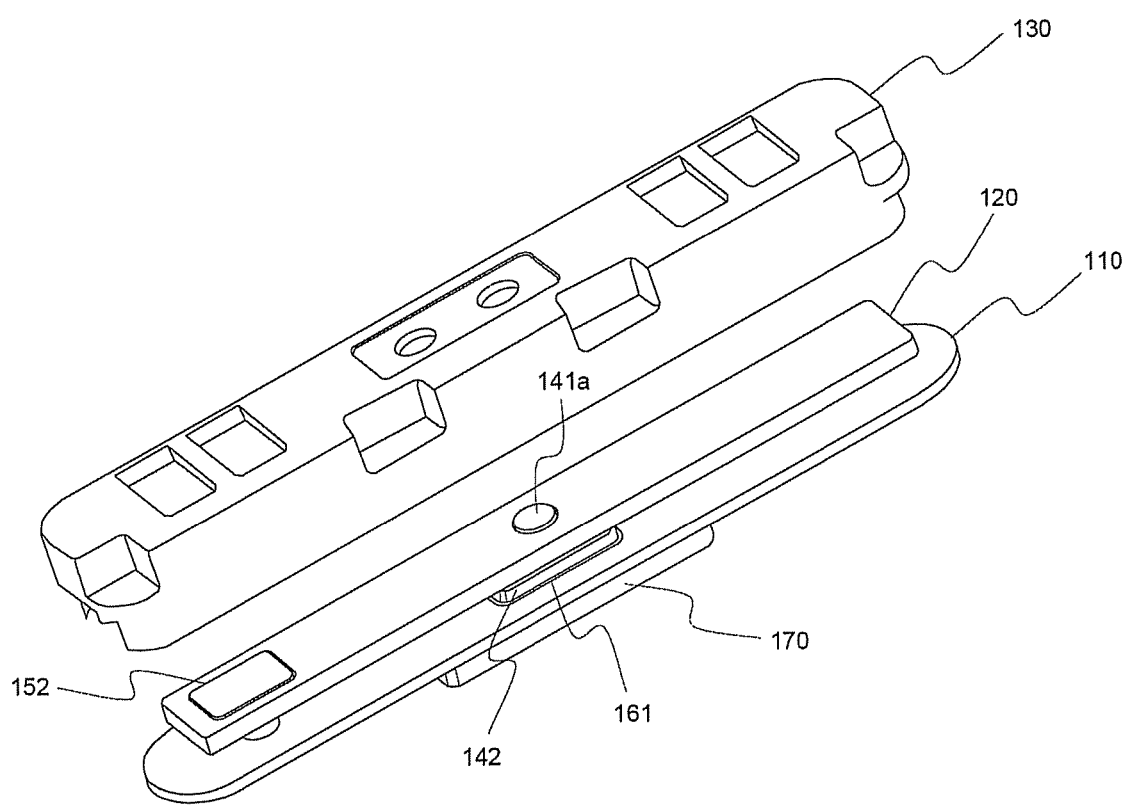
FIG. 2 is a perspective view illustrating the cap assembly of FIG. 1 after a protection circuit module (PCM) is coupled to a base plate using rivets and before the coupled parts are mounted to a top cap.

Hereinafter, the assembly process of the cap assembly 100 will be described with reference to FIGS. 1 and 2.

The upper gasket 161 and the lower gasket 162 are fitted to the middle through-hole 114 of the base plate 110. While the conductive plate 170 is positioned at the lower end of the lower gasket 162, the lower cylindrical body 141b of the rivet 140 is inserted through through-holes of the upper and lower gaskets 161 and 162 and the opening 174 of the conductive plate 170. The lower cylindrical body 141b of the rivet 140 has a length sufficient to partially protrude from the opening 174 of the conductive plate 170 when the lower cylindrical body 141b of the rivet 140 is inserted as described above. Consequently, it is possible to press (rivet) the protruding lower end of the rivet 140, thereby accomplishing the coupling between the rivet 140 and the base plate 110.

Subsequently, the upper cylindrical body 141a of the rivet 140 is inserted through the middle through-hole 124 of the PCM 120. The upper cylindrical body 141a of the rivet 140 also has a length sufficient to partially protrude from the through-hole 124 of the PCM 120 when the upper cylindrical body 141a of the rivet 140 is inserted as described above. Consequently, it is possible to press the protruding upper end of the rivet 140, thereby accomplishing the coupling between the rivet 140 and the PCM 120.

Finally, the cylindrical body 151 of the rivet 150 is sequentially inserted through the side through-hole 125 of the PCM 120 and the side through-hole 115 of the base plate 110. The cylindrical body 151 of the rivet 150 has a length sufficient to partially protrude from the through-hole 115 of the base plate 110 when the cylindrical body 151 of the rivet 150 is inserted as described above. Consequently, it is possible to press the protruding lower end of the rivet 150, thereby accomplishing the coupling between the rivet 150 and the base plate 110.

While the mechanical coupling is accomplished between the PCM 120 and the base plate 110, the base plate 110 is located at the open upper end of the battery case (not shown), and then the base plate 110 is coupled to the battery case by welding. After that, the top cap 130 is mounted to the upper end of the battery case. However, the mechanical coupling between the PCM 120 and the base plate 110 using the rivets 140 and 150 is not limited by the above-described coupling process. In other words, the mechanical coupling between the PCM 120 and the base plate 110 may be performed in various manners.

Through the above-described assembly process, the base plate 110 and the PCM 120 are mechanically coupled with each other while the base plate 110 and the PCM 120 are spaced a predetermined distance from each other due to the plate-shaped body 142 of the rivet 140 interposed between the base plate 110 and the PCM 120, and the electrical connection between the base plate 110 and the PCM 120 is accomplished by the rivets 140 and 150.

Figure 3:
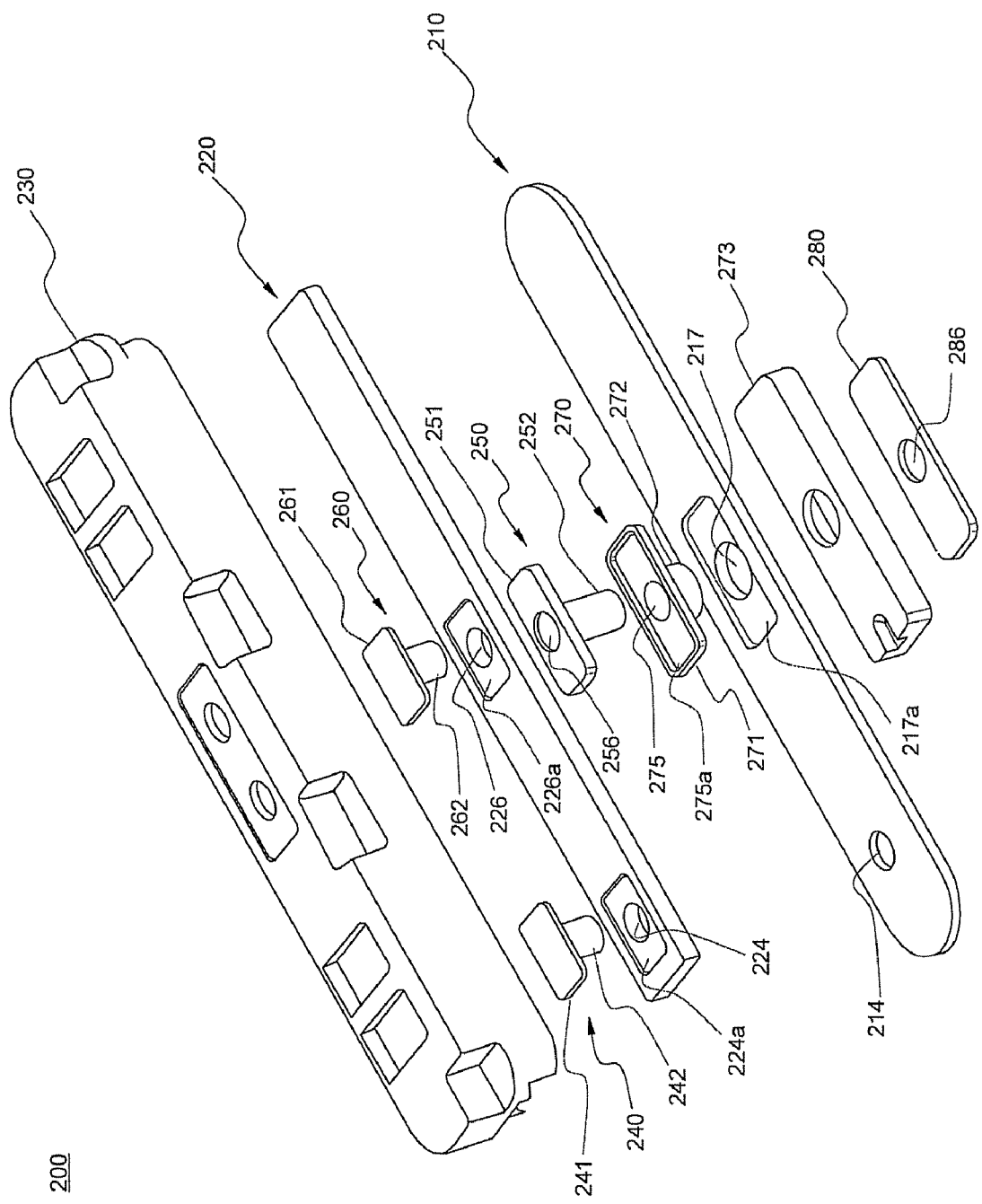
FIG. 3 is an exploded perspective view illustrating a cap assembly according to a second preferred embodiment of the present invention.

FIG. 3 is an exploded perspective view illustrating a cap assembly according to a second preferred embodiment of the present invention.

Referring to FIG. 3, the cap assembly 200 includes a base plate 210 mounted to an open upper end of a battery case (not shown), a PCM 220 mounted on the base plate 210, and a top cap 230 coupled to the upper end of the battery case while the top cap 230 covers the PCM 220. The top cap 230 is made of an insulative material.

The base plate 210 and the PCM 220 are provided in the middles thereof with through-holes 217 and 226, respectively. Also, the base plate 210 and the PCM 220 are provided in one-side parts thereof with through-holes 214 and 224, respectively. Three rivets 240, 250, and 260 are inserted through the corresponding through-holes 214, 217, 224, and 226, whereby the electrical connection and mechanical coupling between the base plate 210 and the PCM 220 are accomplished.

The structure and coupling of the rivets 240, 250, and 260 will be described hereinafter in more detail.

The first rivet 240 includes a plate-shaped upper end 241 and a cylindrical body 242. The first rivet 240 is inserted through the through-hole (Pa) 224 of the PCM 220 and the through-hole (Ba) 214 of the base plate 210. Consequently, the first rivet 240 is connected to a cathode of a battery cell with the result that the first rivet 240 is electrically connected to the base plate 210, which constitutes a cathode terminal of the battery cell. Around the through-hole 224 of the PCM 220, through which the first rivet 240 is inserted, is formed a depression 224a corresponding to the upper end 241 of the first rivet 240, whereby the first rivet 240 is more stably mounted to the PCM 220.

The second rivet 250 includes a plate-shaped upper end 251 and a cylindrical body 252. The second rivet 250 is inserted through the through-hole (Bb) 217 of the base plate 210 and an opening 286 of a conductive plate 280 connected to an anode of the battery cell. At this time, an upper gasket 270 is mounted at the though-hole 217 of the base plate 210 in such a manner that the upper gasket 270 covers the upper end surface and the inner circumferential surface of the though-hole 217, and a lower gasket 273 is mounted at the through-hole 217 of the base plate 210 in such a manner that the lower gasket 273 covers the lower end surface of the though-hole 217, whereby the second rivet 250 is electrically isolated from the base plate 210.

The upper gasket 270 includes an upper end 271 and a cylindrical body 272 having an insertion hole (B) 275, through which the cylindrical body 252 of the second rivet 250 is inserted. The insertion hole 275 communicates with the upper end 271. At the upper end of the upper gasket 270 is formed a depressed groove 275a corresponding to the upper end 251 of the second rivet 250, whereby more stable electrical isolation is secured. The lower gasket 273 serves to isolate the base plate 210 and the conductive plate 280 from each other. For this reason, the lower gasket 273 has a size greater than that of the conductive plate 280. The upper and lower gaskets 270 and 273 are coupled with each other in a structure in which the lower end of the cylindrical body 272 of the upper gasket 270 is inserted through an insertion hole 274 of the lower gasket 273.

Also, a coupling hole 256 having an inner diameter substantially equal to or slightly less than the outer diameter of a cylindrical body 262 of the third rivet 260 is formed at the upper end 251 of the second rivet 250 such that the second rivet 250 is coupled with the third rivet 260 in a forced-inserting fashion. Consequently, when the third rivet 260 is hammered while the third rivet 260 is located at the upper end of the second rivet 250, the lower end of the cylindrical body 262 of the third rivet 260 is forcibly inserted into the coupling hole 256 of the second rivet 250, and therefore, the coupling between the second rivet 250 and the third rivet 260 is accomplished.

The third rivet 260 includes a plate-shaped upper end 261 and a cylindrical body 262. The third rivet 260 is connected to the anode of the battery cell via the second rivet 250. The third rivet 260 is inserted through the through-hole (Pb) 226 of the PCM 220, and is forcibly inserted into the coupling hole 256 of the second rivet 250 as described above. Around the through-hole 226 of the PCM 220, through which the third rivet 260 is inserted, is formed a depression 226a corresponding to the upper end 261 of the third rivet 260, whereby the third rivet 260 is more stably mounted to the PCM 220.

Figure 4:
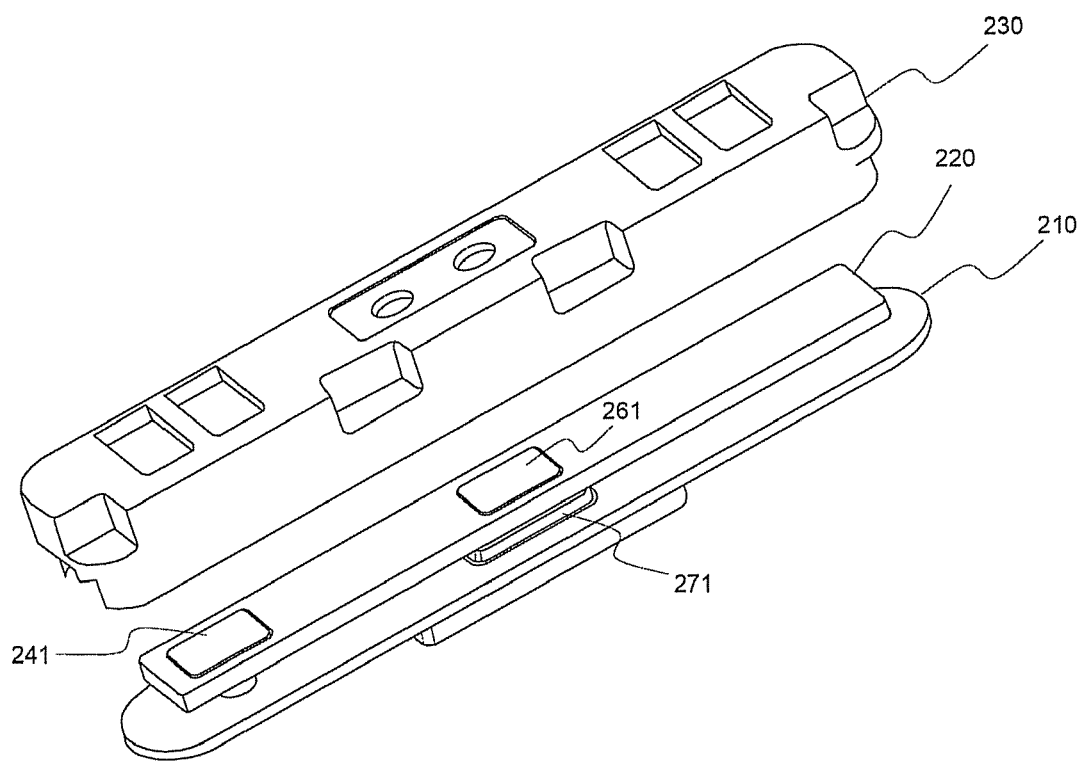
FIG. 4 is a perspective view illustrating the cap assembly of FIG. 3 after a PCM is coupled to a base plate using rivets and before the coupled parts are mounted to a top cap.

Hereinafter, the assembly process of the cap assembly 200 will be described with reference to FIGS. 3 and 4.

The upper gasket 270 and the lower gasket 273 are fitted to the middle through-hole 217 of the base plate 210. While the conductive plate 280 is positioned at the lower end of the lower gasket 273, the cylindrical body 252 of the second rivet 250 is inserted through the insertion holes 275 and 274 of the upper and lower gaskets 270 and 273 and the opening 286 of the conductive plate 280. The cylindrical body 242 of the second rivet 240 has a length sufficient to partially protrude from the opening 286 of the conductive plate 280 when the cylindrical body 242 of the second rivet 240 is inserted as described above. Consequently, it is possible to press (rivet) the protruding lower end of the second rivet 240, thereby accomplishing the coupling between the second rivet 240 and the base plate 210.

Subsequently, the PCM 220 is located on the base plate 210 such that the middle through-hole 226 of the PCM 220 communicates with the coupling hole 256 of the second rivet 250, and then the cylindrical body 262 of the third rivet 260 is forcibly inserted into the coupling hole 256 of the second rivet 250.

Finally, the cylindrical body 242 of the first rivet 240 is sequentially inserted through the side through-hole 224 of the PCM 220 and the side through-hole 214 of the base plate 210. The cylindrical body 242 of the first rivet 240 has a length sufficient to partially protrude from the side through-hole 214 of the base plate 210 when the cylindrical body 242 of the first rivet 240 is inserted as described above. Consequently, it is possible to press the protruding lower end of the first rivet 240, thereby accomplishing the coupling between the first rivet 240 and the base plate 210.

While the mechanical coupling is accomplished between the PCM 220 and the base plate 210, the base plate 210 is located at the open upper end of the battery case (not shown), and then the base plate 210 is coupled to the battery case by welding. After that, the top cap 230 is mounted to the upper end of the battery case. However, the mechanical coupling between the PCM 220 and the base plate 210 using the three rivets 240, 250, and 260 is not limited by the above-described coupling process. In other words, the mechanical coupling between the PCM 220 and the base plate 210 may be accomplished in various manners.

Through the above-described assembly process, the base plate 210 and the PCM 220 are mechanically coupled with each other while the base plate 210 and the PCM 220 are spaced a predetermined distance from each other due to the plate-shaped upper end 251 of the second rivet 250 interposed between the base plate 210 and the PCM 220, and the electrical connection between the base plate 210 and the PCM 220 is accomplished by the rivets 240, 250, and 260.

Figure 5:
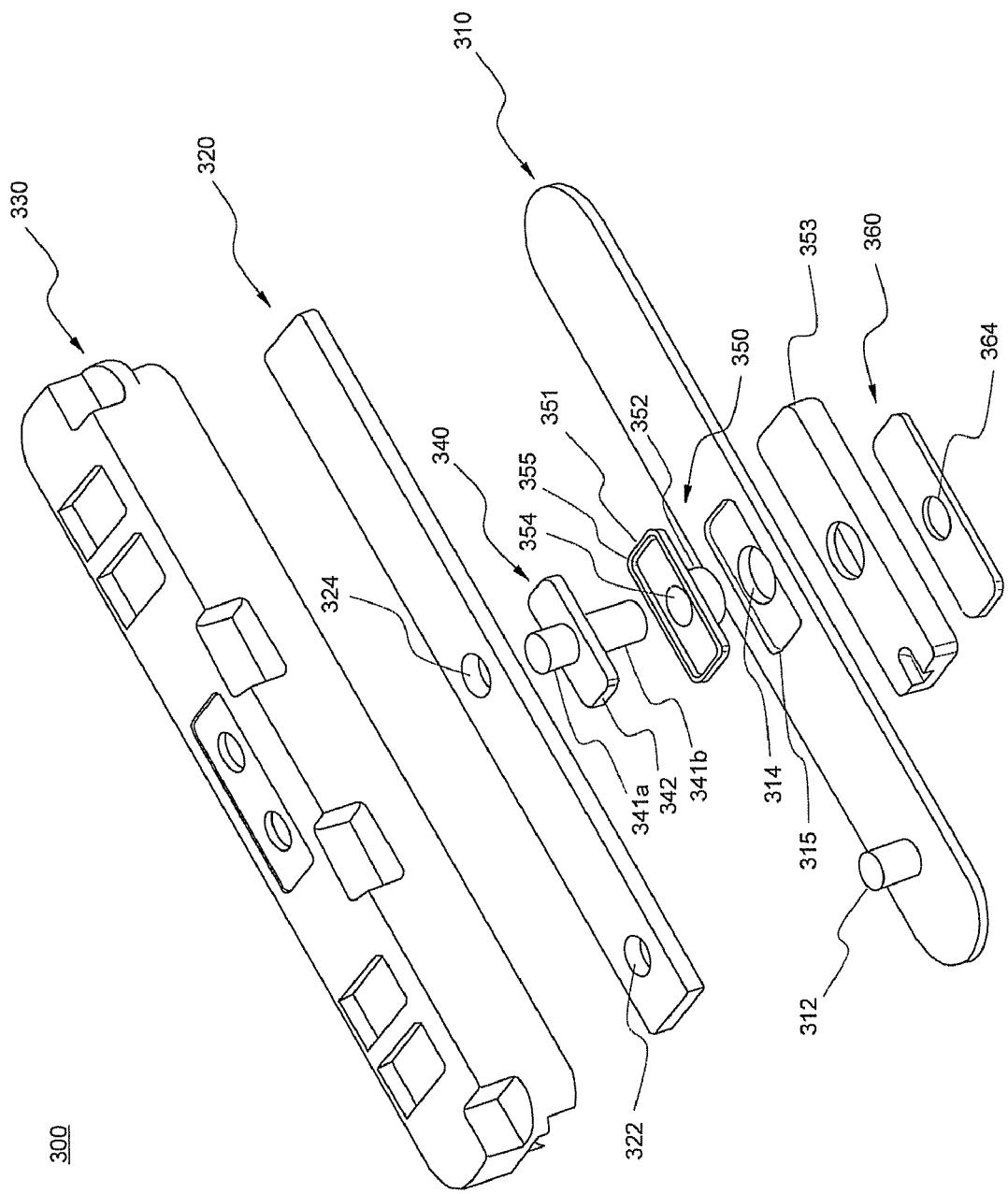
FIG. 5 is an exploded perspective view illustrating a cap assembly according to a third preferred embodiment of the present invention.

FIG. 5 is an exploded perspective view illustrating a cap assembly according to a third preferred embodiment of the present invention.

Referring to FIG. 5, the cap assembly 300 includes a base plate 310 mounted to an open upper end of a battery case (not shown), a PCM 320 mounted on the base plate 310, and a top cap 330 coupled to the upper end of the battery case while the top cap 330 covers the PCM 320. The top cap 330 is made of an insulative material.

The base plate 310 is provided in the middle thereof with a through-hole (c) 314, through which a rivet 340 is inserted. The rivet 340 is connected to an anode of a battery. The base plate 310 is provided in a one-side part thereof with a coupling member 312, which protrudes in the direction where the PCM 320 is mounted. The coupling member 312 is connected to a cathode of the battery.

The PCM 320 is provided in the middle thereof with a through-hole (b) 324 corresponding to the through-hole 314 of the base plate 310 such that the rivet 340 is inserted through the through-hole 324. The PCM 320 is provided in a one-side part thereof with a through-hole (a) 322, through which the coupling member 312 of the base plate 310 is inserted.

While the PCM 320 is located on the base plate 310, therefore, the coupling member 312 is inserted through the through-hole 322, and the rivet 340 is inserted through the through-holes 324 and 314, thereby accomplishing the mechanical coupling and electrical connection between the base plate 310 and the PCM 320.

The rivet 340, which is connected to the anode of the battery, specifically an electrode assembly (not shown), serves to space the base plate 310 and the PCM 320 from each other. Also, the rivet 340 constitutes a protruding terminal located on the base plate 310. The rivet 340 includes cylindrical bodies 341a and 341b and a plate-shaped body 342, having a predetermined thickness, interposed between the cylindrical bodies 341a and 341b. The upper cylindrical body 341a of the rivet 340 is inserted through the through-hole 324 of the PCM 320, and the lower cylindrical body 341b of the rivet 340 is inserted through the through-hole 314 of the base plate 310.

On the other hand, the coupling member 312 of the base plate 310, which is connected to the cathode of the electrode assembly, protrudes by a length corresponding to the space distance between the PCM 320 and the base plate 310 defined by the plate-shaped body 342 of the rivet 340. The coupling member 312 of the base plate 310 is formed in a cylindrical shape such that the coupling member 312 corresponds to the through-hole 322 of the PCM 320.

Before the rivet 340 is inserted through the through-hole 314 of the base plate 310, an insulative gasket is mounted at the through-hole 314. The gasket includes an upper gasket 350 and a lower gasket 353. The upper gasket 350 includes a cylindrical body 351 disposed at the upper end of the base plate 310 and inserted in the through-hole 314 of the base plate 310 such that the cylindrical body 351 covers the inner circumferential surface of the through-hole 314, and an upper end 352 formed in a plate-shaped structure to cover the upper end surface of the through-hole 314. On the other hand, the lower gasket 353 is disposed at the lower end of the base plate 310. The lower gasket 352 is formed in a plate-shaped structure to cover the lower end surface of the through-hole (c) 314. In the cylindrical body 352 and the upper end 351 of the upper gasket 350 is vertically formed an insertion hole 354, through which the lower cylindrical body 341b of the rivet 340 is inserted.

To the lower end of the lower gasket 353 is mounted a conductive plate 360. The conductive plate 360 is a region where the anode terminal of the electrode assembly is connected by welding. The conductive plate 360 is provided with an opening 364, through which the lower end of the rivet 340 is inserted. The lower gasket 353 mounted to the lower end of the base plate 310 has a size greater than that of the conductive plate 360 such that contact between the conductive plate 360 and the base plate 310 is prevented. Alternatively, the lower gasket 353 may be formed in a structure to cover the upper end surface and the side surface of the conductive plate 360.

Around the through-hole 314 of the base plate 310 is formed a depression 315, in which the plate-shaped body 342 of the rivet 340 is located when the rivet 340 is inserted through the through-hole 314. The rivet 340 is inserted through the through-hole 314 of the base plate 310 via the upper gasket 350. For this reason, the depression 315 of the base plate 310 has a size corresponding to that of the upper gasket 350. At the upper end of the upper gasket 350 is formed a depression 355, in which the plate-shaped body 342 of the rivet 340 is located.

Figure 6:
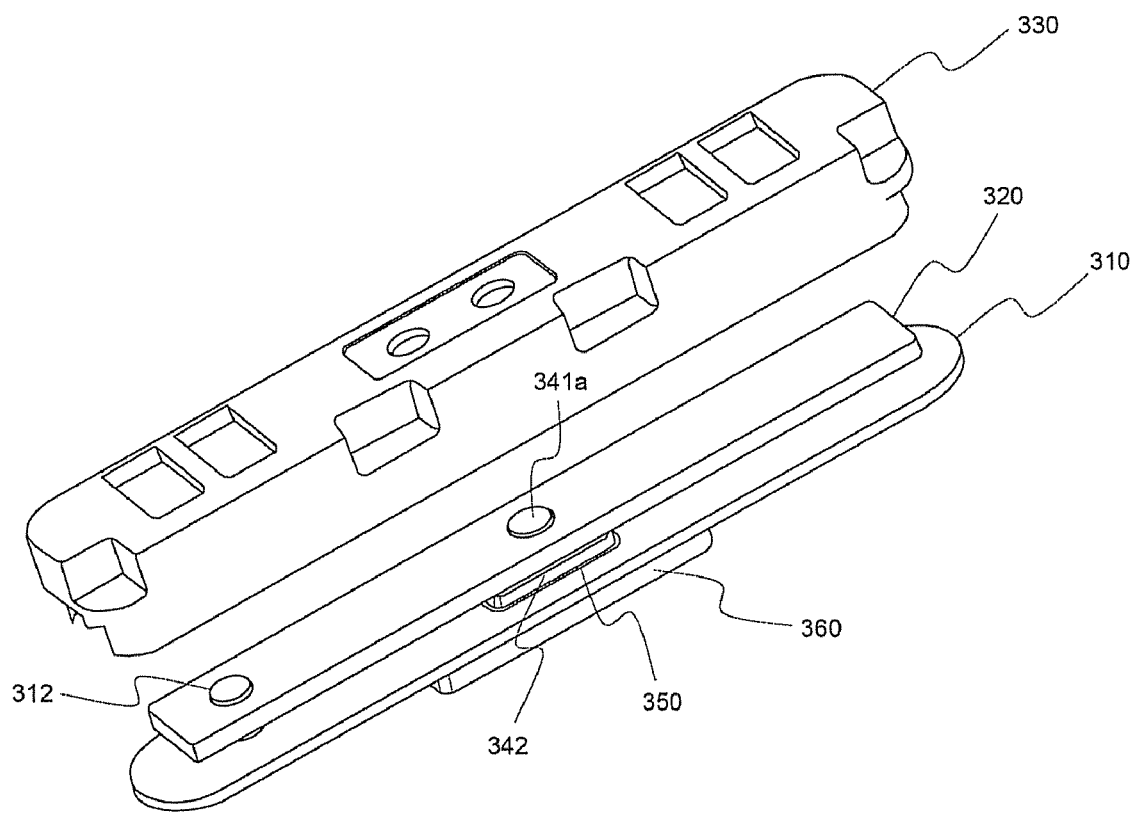
FIG. 6 is a perspective view illustrating the cap assembly of FIG. 5 after a PCM is coupled to a base plate using a rivet and a coupling member of the base plate and before the coupled parts are mounted to a top cap.

Hereinafter, the assembly process of the cap assembly 300 will be described with reference to FIGS. 5 and 6.

The upper gasket 350 and the lower gasket 353 are fitted to the middle through-hole 314 of the base plate 310. While the conductive plate 360 is positioned at the lower end of the lower gasket 353, the lower cylindrical body 341b of the rivet 340 is inserted through the insertion holes 354 of the upper and lower gaskets 350 and 353 and the opening 364 of the conductive plate 360. The lower cylindrical body 341b of the rivet 340 has a length sufficient to partially protrude from the opening 364 of the conductive plate 360 when the lower cylindrical body 341b of the rivet 340 is inserted as described above. Consequently, it is possible to press (rivet) the protruding lower end of the rivet 340, thereby accomplishing the coupling between the rivet 340 and the base plate 310.

Subsequently, the upper cylindrical body 341a of the rivet 340 is inserted through the middle through-hole 324 of the PCM 320. The upper cylindrical body 341a of the rivet 340 also has a length sufficient to partially protrude from the through-hole 324 of the PCM 320 when the upper cylindrical body 341a of the rivet 340 is inserted as described above. Consequently, it is possible to press the protruding upper end of the rivet 340, thereby accomplishing the coupling between the rivet 340 and the PCM 320.

When the rivet 340 is inserted through the middle through-hole 324 of the PCM 320 and the middle through-hole 314 of the base plate 310 as described above, the coupling member 312 protruding from the one-side part of the base plate 310 is inserted through the side through-hole 322 of the PCM 320.

The coupling member 312 of the base plate 310 has a length sufficient to partially protrude from the through-hole 322 of the PCM 320 when the coupling member 312 is inserted through the through-hole 322 of the PCM 320 as described above. Consequently, it is possible to press the protruding lower end of the rivet 150, thereby accomplishing the coupling between the coupling member 312 and the PCM 320.

While the mechanical coupling is accomplished between the PCM 320 and the base plate 310, the base plate 310 is located at the open upper end of the battery case (not shown), and then the base plate 310 is coupled to the battery case by welding. After that, the top cap 330 is mounted to the upper end of the battery case. However, the mechanical coupling between the PCM 320 and the base plate 310 using the rivet 340 and the coupling member 312 is not limited by the above-described coupling process. In other words, the mechanical coupling between the PCM 320 and the base plate 310 may be performed in various manners.

Through the above-described assembly process, the base plate 310 and the PCM 320 are mechanically coupled with each other while the base plate 310 and the PCM 320 are spaced a predetermined distance from each other due to the plate-shaped body 342 of the rivet 340 interposed between the base plate 310 and the PCM 320, and the electrical connection between the base plate 310 and the PCM 320 is accomplished by the rivet 340 and the coupling member 312 protruding from the base plate 310.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As apparent from the above description, the no-welding type battery pack using the one or more forced-inserting type rivets can be manufactured without welding or soldering requiring an excessive amount of time and skilled technique during the electrical connection between the battery cell and the PCM. As a result, the assembly process of the battery pack is simplified, and therefore, the manufacturing time of the battery pack is reduced. Consequently, the manufacturing costs of the battery pack are decreased, the automation of the assembly process is accomplished, and the structural stability of the battery pack is improved.

What is claimed is:

1. A cap assembly comprising:
a base plate mounted to an open upper end of a battery case;
a protection circuit module (PCM) mounted on the base plate; and
a top cap coupled to the upper end of the battery case while the top cap covers the PCM, the top cap being made of an insulative material, wherein
the electrical connection and the mechanical coupling between the PCM and the base plate are accomplished by one or more forced-inserting type rivets; and
one of the rivets (rivet (A)) includes a cylindrical body and a plate-shaped body, having a predetermined thickness, formed at the middle of the cylindrical body, such that the rivet (A) serves to space the PCM and the base plate by a predetermined distance from each other, and the et (A) constitutes a protruding terminal located on the base plate.

2. The cap assembly according to claim 1, wherein the PCM and the base plate are provided with two through-holes connected to a cathode and anode of a battery, and the rivets are inserted through the corresponding through-holes while the PCM is positioned on the base plate.

3. The cap assembly according to claim 1, wherein one of the rivets (rivet (B)) includes a plate-shaped upper end and a cylindrical body.

4. The cap assembly according to claim 1, further comprising:
a gasket mounted at the through-hole (a) of the base plate, through which the rivet (A) is inserted, such that the gasket covers the upper end surface, the lower end surface, and the inner circumferential surface of the through-hole (a), the gasket being made of an insulative material.

5. The cap assembly according to claim 4, further comprising:
a conductive plate mounted to the lower end of the gasket, the conductive plate having an opening, connected to an electrode terminal of a battery cell, through which the lower end of the rivet (A) is inserted.

6. The cap assembly according to claim 5, wherein the rivet (A) has a length sufficient to be sequentially inserted through the PCM, the base plate, the gasket, and the conductive plate and be pressed to the upper end surface of the PCM and the lower end surface of the conductive plate.

7. The cap assembly according to claim 1, wherein the base plate is provided around the through-hole (a) thereof, through which the rivet (A) is inserted, with a depression, in which the plate-shaped body of the rivet is located.

8. The cap assembly according to claim 4, wherein the gasket includes two members coupled to the upper and lower end surfaces of the base plate, or the gasket is formed in an integrated structure by insert injection molding.

9. A cap assembly comprising:
a base plate mounted to an open upper end of a battery case
a protection circuit module (PCM) mounted on the base plate; and
a top cap coupled to the upper end of the battery case while the top cap covers the PCM, the top cap being made of an insulative material, wherein
the electrical connection and the mechanical coupling between the PCM and the base plate are accomplished by one or more forced-inserting type rivets:
the PCM and the base plate are provided with two through-holes connected to a cathode and anode of a batter T. and the rivets are inserted through the corresponding through-holes while the PCM is positioned on the base plate:
three rivets are inserted through the through-holes so as to accomplish the electrical connection and mechanical coupling between the PCM and the base plate; and
the first rivet is inserted through the through-hole (Pa) of the PCM and the through-hole (Ba) of the base plate, and the third rivet is coupled to the upper end of the second rivet through the through-hole (Pb) of the PCM.

10. The cap assembly according to claim 9, wherein the second rivet includes a plate-shaped upper end and a cylindrical body, and the third rivet is coupled to the upper end of the second rivet in a forced-inserting fashion.

11. The cap assembly according to claim 9, wherein the second rivet is provided at the upper end thereof with a coupling hole having an inner diameter substantially equal to or slightly less than the outer diameter of a cylindrical body of the third rivet, and the lower end of the cylindrical body of the third rivet is forcibly inserted into a coupling hole of the second rivet by applying a strong external force to the third rivet while the lower end of the cylindrical body of the third rivet is located at the coupling hole of the second rivet, whereby the coupling between the second rivet and the third rivet is accomplished.

12. The cap assembly according to claim 1,
wherein the PCM has two through-holes (a, b) connected to a cathode and an anode of a battery, respectively, and the base plate is provided with a coupling member and a through-hole (c) corresponding to the through-holes of the PCM, respectively, and
wherein, while the PCM is positioned on the base plate, the coupling member is inserted through the through-hole (a), and the rivet is inserted through the through-hole (b) and the through-hole (c).

13. The cap assembly according to claim 12, wherein the coupling member protrudes from the base plate by a length corresponding to the space distance between the PCM and the base plate while the rivet is inserted through the through-hole (a) of the base plate.

14. A battery pack constructed in a structure in which a cap assembly according to claim 1 is coupled to an open upper end of a battery case containing an electrode assembly.

15. The battery pack according to claim 14, wherein the battery case is a prismatic metal container.

16. A battery pack constructed in a structure in which a cap assembly according to claim 9 is coupled to an open upper end of a battery case containing an electrode assembly.

17. The battery pack according to claim 16, wherein the battery case is a prismatic metal container.

* * * * *